(12) United States Patent
Venkumahanti et al.

(10) Patent No.: US 6,785,772 B2
(45) Date of Patent: Aug. 31, 2004

(54) DATA PREFETCHING APPARATUS IN A DATA PROCESSING SYSTEM AND METHOD THEREFOR

(75) Inventors: Suresh Venkumahanti, Austin, TX (US); Michael Dean Snyder, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 230 days.

(21) Appl. No.: 10/132,918

(22) Filed: Apr. 26, 2002

(65) Prior Publication Data

US 2003/0204673 A1 Oct. 30, 2003

(51) Int. Cl.$^7$ .............................................. G06F 12/00
(52) U.S. Cl. ....................... 711/137; 711/128; 711/158; 711/213; 712/207
(58) Field of Search .............................. 711/137, 128, 711/158, 213; 712/707

(56) References Cited

U.S. PATENT DOCUMENTS

| | | | |
|---|---|---|---|
| 5,623,608 A | * | 4/1997 | Ng .............................. 711/137 |
| 6,073,215 A | | 6/2000 | Snyder |
| 6,119,203 A | | 9/2000 | Snyder et al. |
| 6,202,130 B1 | | 3/2001 | Scales et al. |
| 6,240,488 B1 | * | 5/2001 | Mowry ........................ 711/128 |
| 6,678,795 B1 | * | 1/2004 | Moreno et al. ............. 711/137 |

* cited by examiner

*Primary Examiner*—Kevin L. Ellis
*Assistant Examiner*—Thang Ho
(74) *Attorney, Agent, or Firm*—Daniel D. Hill; James L. Clingan, Jr.

(57) ABSTRACT

A data processing system (20) is able to perform parameter-selectable prefetch instructions to prefetch data for a cache (38). When attempting to be backward compatible with previously written code, sometimes performing this instruction can result in attempting to prefetch redundant data by prefetching the same data twice. In order to prevent this, the parameters of the instruction are analyzed to determine if such redundant data will be prefetched. If so, then the parameters are altered to avoid prefetching redundant data. In some of the possibilities for the parameters of the instruction, the altering of the parameters requires significant circuitry so that an alternative approach is used. This alternative but slower approach, which can be used in the same system with the first approach, detects if the line of the cache that is currently being requested is the same as the previous request. If so, the current request is not executed.

21 Claims, 3 Drawing Sheets

| OLD | | | NEW | | |
|---|---|---|---|---|---|
| NUMBER OF 16 BYTE UNITS IN BLOCK | STRIDE | NUMBER OF BLOCKS | NUMBER OF 16 BYTE UNITS IN BLOCK | STRIDE | NUMBER OF BLOCKS |
| 1 (16 BYTES) | ±16 | 4n | 4 (64 BYTES) | ±64 BYTES | n |
| 1 (16 BYTES) | ±32 | 2n | 4 (64 BYTES) | ±64 BYTES | n |
| 2 (32 BYTES) | ±32 | 2n | 4 (64 BYTES) | ±64 BYTES | n |
| CACHE LINE SIZE = 64 BYTES | | | | | |

DATA PREFETCHING APPARATUS IN A DATA PROCESSING SYSTEM AND METHOD THEREFOR

FIELD OF THE INVENTION

The present invention relates generally to data processing systems and more specifically to prefetching data in a data processing system.

RELATED ART

Microprocessors designed for desktop applications such as personal computers (PCs) have been optimized for processing multimedia applications such as video programs. When processing the video data, the microprocessor must create frames of decompressed data quickly enough for display of the video data on the PC screen in real time. However, it is sometimes difficult for the processor to process the data quickly enough because of long memory access latencies. Several mechanisms have been developed to remove the long memory access latencies.

One class of prefetch instructions designed to remove the long memory access latencies is the data stream touch (DST) instruction. DST instructions are classified as asynchronous because the instructions can specify a very large amount on memory to be prefetched in increments of cache blocks by a DST controller, or engine. The DST engine runs independently of normal load and store instructions. That is, the DST engine runs in the background while the processor continues normally with the execution of other instructions. DST instructions are useful where memory accesses are predictable and can be used to speed up many applications, such as for example, multimedia applications.

A DST instruction, as included in an application, includes a unit size, number of blocks, and a stride value. When a DST engine receives a DST instruction, the DST engine retrieves data to be written to the cache memory at a starting address according to the unit size, the stride value, and the number of blocks. The data is retrieved in the background quickly enough to stay ahead of the microprocessor unit (MPU). However, if an application that makes use of the DST instruction is executed in a data processing system having a longer cache line length than assumed by the programmer, then the DST instruction may generate redundant accesses to the cache if the stride value is less than the longer cache line length. The redundant accesses can cause reduced performance and extra power consumption. Therefore, there is a need to reduce the possibility of redundant prefetch accesses in systems that run applications having DST instructions.

BRIEF DESCRIPTION OF THE DRAWINGS

The present invention is illustrated by way of example and not limitation in the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

Generally, the present invention provides a data processing system for executing a DST instruction that reduces the number of redundant accesses to a cache memory. The data processing system includes an instruction modifier that detects a DST instruction that will generate a redundant access to the cache and modifies the instruction to prevent redundant accesses before the instruction is provided to the DST engine. In those cases where it is not possible to modify the instruction, a "filter" is implemented at the backend of DST engine that removes redundant accesses based on a history of prior accesses. In other embodiments, the filter may be used without using the instruction modifier.

Figure 1:
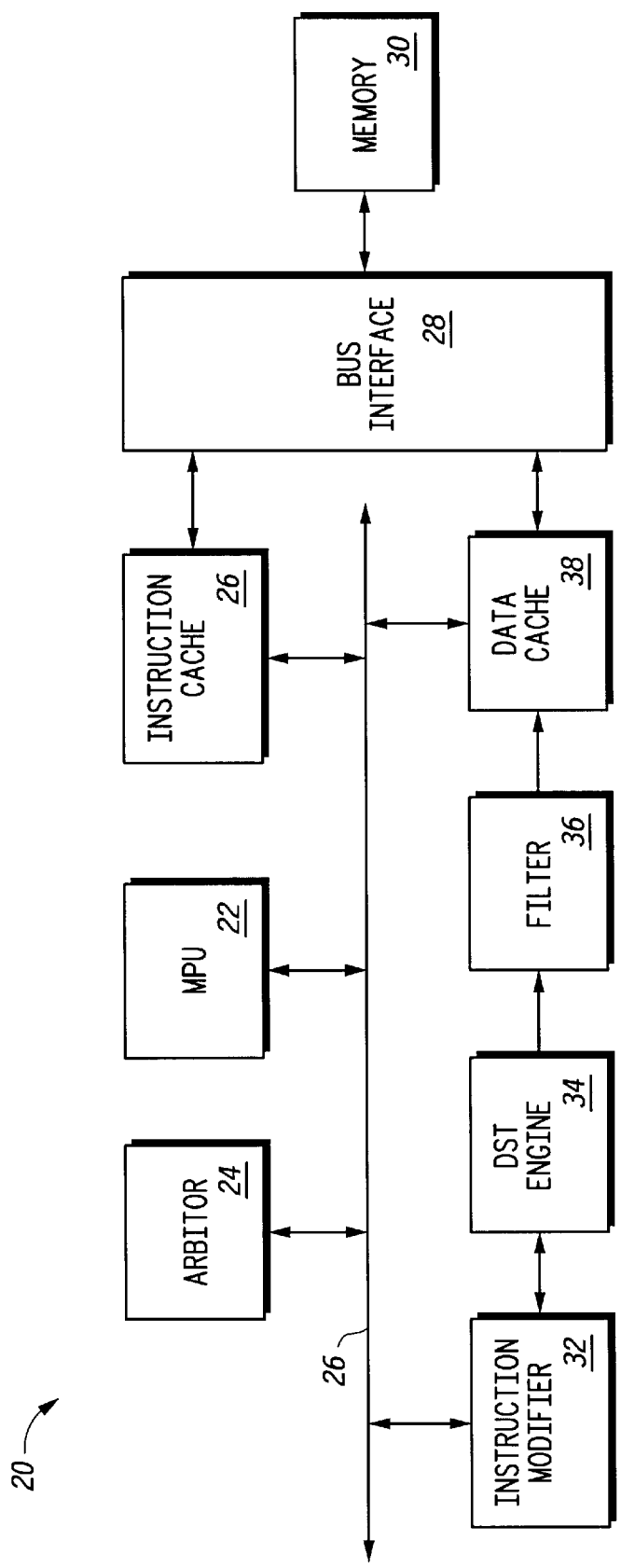
FIG. 1 illustrates, in block diagram form, a data processing system in accordance with one embodiment of the present invention.

FIG. 1 illustrates, in block diagram form, a data processing system 20 in accordance with one embodiment of the present invention. Data processing system 20 includes a microprocessor unit (MPU) 22, an arbitor 24, an instruction cache 26, a bus interface unit 28, a memory 30, an instruction modifier 32, a DST engine 34, a filter 36, and a data cache 38. A bus 26 is used to interconnect MPU 22 to the other blocks of FIG. 1. Bus interface unit 28 couples each of instruction cache 26 and data cache 38 to memory 30.

In operation, MPU 22 executes instructions received from instruction cache 26. If a DST instruction is included, the DST instruction is provided to DST engine 34 via instruction modifier 32. Instruction modifier 32 is used to modify the DST instruction, if necessary, before it is used by DST engine 34. The instruction will need to be modified if leaving it unmodified would result in redundant accesses to data cache 38. In the illustrated embodiment, instruction modifier 32 includes a table of new parameters that are substituted for corresponding old parameters. The DST engine 34 then executes the DST instruction to generate a stream of data prefetches from memory 30 to be stored in data cache 38. Data cache 38 is typically implemented as a very fast memory that functions to temporarily store data for use by MPU 22. Therefore, data cache 38 is usually loaded with data from the relatively slower main memory before it is provided to MPU 22. The DST instruction is used to generate the stream of data prefetches to keep data cache 38 supplied with data that is to be used by MPU 22. Arbitor 24 determines whether and when MPU 22 or filter 36 accesses data cache 38.

Figure 2:
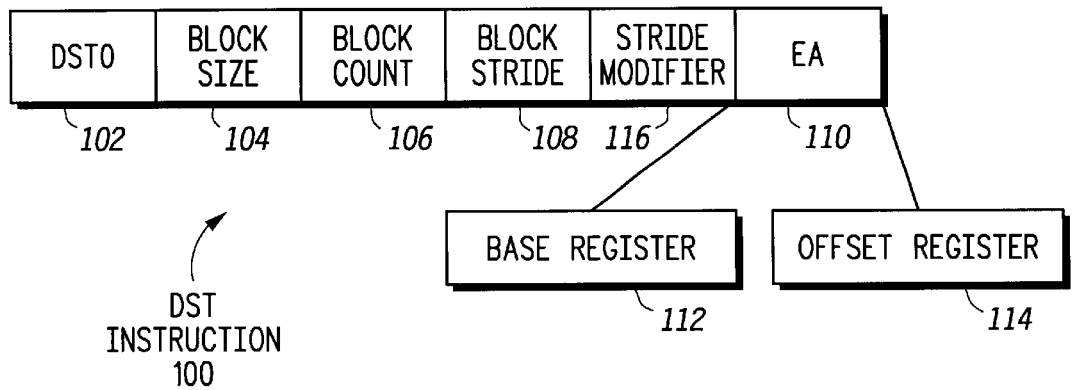
FIG. 2 illustrates a data stream touch instruction as used in the data processing system of FIG. 1.

FIG. 2 illustrates a data stream touch instruction 100 as used in the data processing system of FIG. 1. With reference now to FIG. 2, there is shown a graphical representation of the fields of a data stream touch load instruction, in accordance with one embodiment of the present invention. The data stream touch load (DST) instruction is used to asynchronously prefetch a stream of bytes from lower levels of the memory hierarchy and causes them to be loaded into the non-architected, higher, faster levels of memory prior to issuance of a load instruction requesting that data stream. As used herein, "non-architected" means not present in the programmer's model. For example, the DST instruction could preload a frame of video data from the system memory into the data cache prior to a load instruction requesting that frame and while the processor is processing a previous frame. Thus, it can be seen that the DST instruction is designed to allow preloading of data from a lower level of memory into a higher level while processor execution is allowed to continue, improving processor speed and efficiency.

As illustrated in FIG. 2, DST instruction 100 includes a plurality of parameter-selectable fields, including an op code 102 labeled "DST0", a BLOCK SIZE 104, a BLOCK COUNT 106, a BLOCK STRIDE 108, a STRIDE MODIFIER 116, and an effective address field (EA) 110. In an alternative embodiment of the present invention, a general-purpose register holds the field data for the BLOCK SIZE, BLOCK COUNT, and BLOCK STRIDE and the DST instruction points to that register. Op code 102 indicates that the instruction is a DST instruction prefetching a data stream or vector from memory. As defined herein, a vector is "prefetched" when it is brought from a lower level of the memory hierarchy into a higher level of the memory hierarchy. BLOCK SIZE 104 indicates the number of vector bytes to be retrieved per block for each memory block of the data stream being retrieved from memory. In one embodiment, a vector is a 16-byte value. In general, the block size is of arbitrary length and multiple fetches will be initiated if the block size exceeds the line size of data cache 38. BLOCK COUNT 106 indicates how many blocks, each of a size equal to BLOCK SIZE 104, will make up the data stream prefetched by this instruction. BLOCK STRIDE 108 indicates the address offset between each block of the data stream. STRIDE MODIFIER 116 indicates a value by which the block stride can be algebraically modified for each block of the block count for this instruction. In one embodiment, BLOCK SIZE 104 is a five-bit field, allowing from 1 to 32 blocks of vector bytes, BLOCK COUNT 106 is an eight-bit field allowing 1 to 256 blocks to be fetched, and BLOCK STRIDE 108 is a signed 16-bit field allowing .+-.32,768 bytes of stride. EA 110 designates two registers, a base register 112 and an offset register 114. The values in these two registers are added together to provide the effective address of the first element of the vector being prefetched from memory. In an alternative embodiment, DST instruction 100 contains register fields replacing fields 104, 106, and 108 that designate registers containing the block size, block count, and block stride control information. This alternative embodiment allows the definition of the data stream prefetch to be calculated dynamically during processor execution by accessing this control information.

As one example of the use of the DST instruction, a 2-dimensional data vector in memory may have some number of rows, each row having a single-dimension vector and residing in sequential memory locations. If the data vector being retrieved from memory is contained in sequential locations in the memory (assuming each element in the vector has an element number index), the vector which is formed by the elements in each row which have the same row index is called a column vector. Thus, for example, to fetch the elements of the column vector, the first element would be prefetched from the effective address indicated by EA 110. Then the block stride would be repetitively added to the previous effective address to form the address of each subsequent element of the column vector. The rows of a vector are prefetched by setting the stride equal to one. The columns of a vector are prefetched by setting the stride equal to the length of the row; for DST instruction 100, BLOCK STRIDE 108 would be made equal to the value of BLOCK SIZE 104 because the block stride would be equal to the length of each row of the two-dimensional vector. Moreover, it will be appreciated by those skilled in the art that the DST instruction can be used to fetch elements of one, two, or higher-dimension vectors. Since a three-dimensional vector may be defined as an array of two-dimensional vectors that each may be called a "page", particular pages within the vector may be accessed by setting the stride value equal to the product of the length of the row and the column of each page or some integer multiple thereof. It will be appreciated that, in general, a vector of any order or number of dimensions may be accessed by the index of its highest order element by setting the stride equal to the product of the length of all the lower order elements. Diagonal vectors within the vector array can be accessed by utilizing an additional field in the DST instruction that modifies the block stride as each block is accessed in memory.

As shown in FIG. 2, STRIDE MODIFIER 116 includes a value by which the block stride is incremented, decremented, or multiplied for each block prefetched to memory. Also in one embodiment of the present invention, prefetching of multiple data streams can be implemented by executing multiple DST instructions. Each data stream is named by encoding the stream name into the DST instruction itself in op code 102, such as DST0 illustrated in FIG. 2. There would be a separate version of a DST instruction for each separate stream. Thus, for example, a vector function of two operands will, in general, need two data streams to be prefetched simultaneously. The DST instruction may encode any number of streams to be prefetched, but the finite resources available to implement the instruction would limit the number of DST instructions to a reasonably small number, such as four. Hardware or software can further be used to multiplex the actual streaming hardware to make it appear that a larger number of streams were available.

Figure 3:
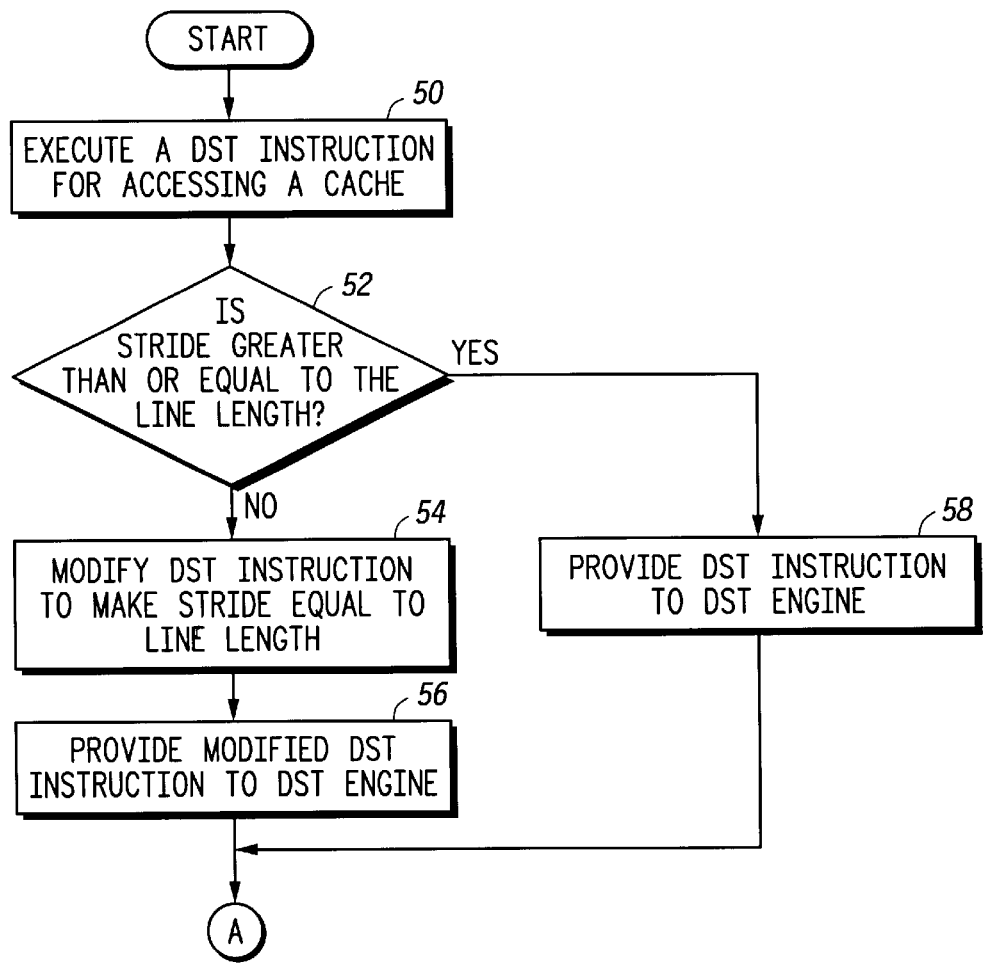
FIG. 3 and FIG. 4 illustrate flow diagrams for prefetching data in accordance with an embodiment of the present invention.
Figures 4, 5:
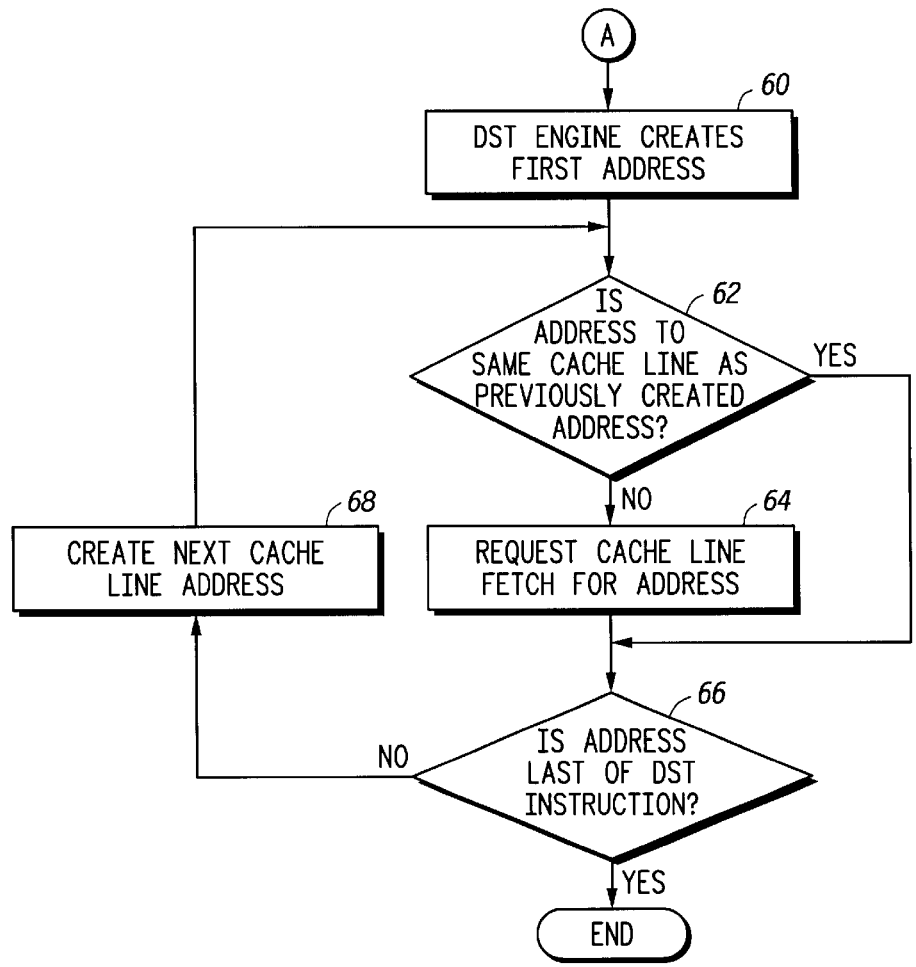
FIG. 5 illustrates a table of values for determining how to modify a data stream touch (DST) instruction in accordance with one embodiment of the present invention.

FIG. 3 illustrates a portion of a flow diagram for prefetching data in accordance with an embodiment of the present invention. At step 50, a DST instruction is executed by MPU 22 for accessing data cache 38. The DST instruction is provided to instruction modifier 32. Instruction modifier 32 detects if a DST instruction is going to generate a redundant access to data cache 38 by detecting if the stride is greater than or equal to the line length of data cache 38 as shown at decision step 52. If the stride is not greater than or equal to the line length, the "NO" path is taken to step 54 where the DST instruction is modified. For example, a DST instruction programmed having two units (16 bytes per unit), a stride of 32 bytes, and a block count of 100 provides a contiguous data stream if the DST instruction is run on a data cache that has a line length of 32 bytes. The DST engine will then make 100 prefetches to the data cache. However, if the same DST instruction is executed on a data cache having a 64 byte cache line, it is still going to do 100 prefetches, but one half of those profetches is going to be redundant because of the 32 byte stride. Generally, a prefetch of a cache line requires that the whole cache line be prefetched. If the stride (32 bytes) is less than the cache line length (64 bytes), the same cache line will be accessed twice because the starting address plus the stride falls in the same cache line. Note that the specific cases of stride length verses line length that are detected in the illustrated embodiment are shown in FIG. 5 and will be discussed later. In other embodiments, different cases may be detected. If the instruction modifier has detected that the answer to decision step 52 is "NO", the method continues to step 54 where the DST instruction is modified to make the stride equal to line length. The block count must also be changed to prefetch the same amount of data. For example, for the previous example, the DST instruction can be modified as shown on the third line of the table in FIG. 5. The number of units is increased to four, the stride becomes 64 bytes and the previous number blocks (2n) is divided by 2, resulting in the number 50 for a new block count (n). This provides the same amount of data but does not access the same cache line again to generate redundant data because the new stride is equal to the new cache line length. At step 56, the modified DST instruction is provided to DST engine 34 and the method continues at "A" in FIG. 4.

However, if at step 52 the stride is greater than or equal to the line length of data cache 38, the "YES" path is taken to step 58. At step 58, the DST instruction is provided unmodified to DST engine 34 and the method continues at "A" in FIG. 4.

FIG. 4 illustrates a flow diagram of another portion of the method for prefetching data in accordance with an embodiment of the present invention. At step 60, DST engine 34 creates a first address to access data cache 38 from the effective address included in the DST instruction received at "A" from the method shown in FIG. 3. The DST instruction may be modified or unmodified. At decision step 62, it is determined if the first address, and each subsequent address generated by DST engine 34, are to the same cache line that was previously accessed. If the address is to the same cache line, the "YES" path is taken to decision step 66, and the address is not provided to data cache 38. At step 66, it is determined if the address is the last address to be generated for the DST instruction. If it is the last address, the DST instruction is complete. If it is not the last address, the "NO" path is taken to step 68 and a new address is generated to assess the data cache. Process flow then proceeds back to the beginning of step 62. If, at decision step 62, it is determined that the address is not the same address as the previous cache line address, then "NO" path is taken to step 64. Note that in the illustrated embodiment, only the previous address is compared to determine is an access to the same cache line. However, one skilled in the art will recognize that any number of previous addresses can be analyzed to determine if cache line has been previously accessed. At step 64, DST engine 34 requests a cache line fetch for the address. The process then proceeds to decision step 66 as previously described. By comparing a current address to the previous address to determine with if a subsequent address is to the same cache line, redundant accesses to the same cache line can be avoided.

FIG. 5 illustrates a table of values for determining how to modify a data stream touch (DST) instruction in accordance with one embodiment of the present invention. The left half of FIG. 5 shows three examples of values for block size, block count and stride of a DST instruction and the right half shows how the values may be modified by instruction modifier 32. Note that the table only shows three specific examples of DST instructions and how the instructions may be modified by instruction modifier 32 to prefetch data without incurring redundant accesses. Note that the variable "n" in FIG. 5 is equal to or greater than 1. The old stride is modified to be equal to the cache line length of the data cache (Number of 16 byte units in block), for example, 64 bytes. The Number of units in the block and the number of blocks are adjusted so that the same amount of data is prefetched taking into account the new data cache line length. The new "Number of Blocks" is generated by dividing the old "Number of Blocks", for example 4n as shown in the first line of FIG. 5, by 4 to get n. In the second and third lines of FIG. 5, the old "Number of Blocks" 2n is modified by dividing by 2 to get "n". Note that the number of blocks does not have to be an even number. If the number of blocks is an odd number, the modification to the DST instruction will still work by using the division remainder to generate the new number of blocks. As discussed above, if instruction modifier 32 cannot modify a DST instruction, a redundant access can still be prevented by filter 36.

A redundant access to the data cache is a useless transaction that probes the data cache and the address translation tables and wastes power. By using the instruction modifier to detect the possibility of redundant accesses to a data cache, performance of the data processing system improves because useless transactions are not occupying system resources required by the processor.

In the foregoing specification, the invention has been described with reference to specific embodiments. However, one of ordinary skill in the art will appreciate that various modifications and changes can be made without departing from the scope of the present invention as set forth in the claims below. Accordingly, the specification and figures are to be regarded in an illustrative rather than a restrictive sense, and all such modifications are intended to be included within the scope of present invention. For example, the invention was illustrated with reference to a 64 byte cache line in FIG. 5. However, one skilled in the art will recognize that the invention can be used with cache lines of any size. Also, the DST filter can be used to prevent redundant accesses in embodiments not having the instruction modifier to modify the DST instruction. Generally, using the filter by itself requires less hardware to implement but with reduced performance over a system having both an instruction modifier and a filter.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variations thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A data processing system for prefetching data for loading into a cache in response to a parameter-selectable prefetch instruction, comprising:

detection means for detecting if the parameter-selectable prefetch instruction has parameters that indicate that a portion of the data is to be prefetched at least twice for the cache during a prefetch operation specified by the parameter-selectable prefetch instruction; and at least one of the following:

modification means for altering the parameters of the parameter-selectable prefetch instruction to avoid prefetching the data at least twice during the prefetch operation; and prevention means for preventing the prefetching of the data at least twice by the parameter-selectable prefetch instruction during the prefetch operation.

2. The data processing system of claim 1, wherein:

the data processing system comprises the modification means; and the detection means compares the parameters to predetermined parameter sets that are known to select redundant data.

3. The data processing system of claim 2, wherein the modification means comprises substitute parameters corresponding to each of the predetermined parameter sets.

4. The data processing system of claim 1 comprising the modification means and the prevention means.

5. A data processing system for prefetching data for loading into a cache in response to a parameter-selectable prefetch instruction, comprising:

detection means for determining if the parameter-selectable instruction has a first programmed condition that causes fetching of redundant data during a prefetch operation; and execution means, coupled to the detection means, for executing the instruction by generating cache line requests, in response to the parameter-selectable prefetch instruction, that are mutually exclusive in order to avoid fetching redundant data during the same prefetch operation.

6. The data processing system of claim 5, wherein the execution means comprises modification means for altering the parameters of the parameter-selectable prefetch instruction to avoid prefetching redundant data.

7. The data processing system of claim 6, wherein the detection means compares the parameters to predetermined parameter sets that are known to select redundant data.

8. The data processing system of claim 7, wherein the modification means comprises substitute parameters corresponding to each of the predetermined parameter sets.

9. The data processing system of claim 5, wherein the execution means comprises prevention means for preventing a request for a line in the cache if a previous request for the line in the cache by the parameter-selectable prefetch instruction was made during the prefetch operation.

10. The data processing system of claim 5, wherein the execution means comprises prevention means for preventing a request for a line in the cache if an immediately preceding request was for the line in the cache during prefetch operation.

11. The data processing system of claim 5, wherein the execution means comprises:

prevention means for preventing a request for a line in the cache if a previous request for the line in the cache by the parameter-selectable prefetch instruction was made during the prefetch operation; and modification means for altering the parameters of the parameter-selectable prefetch instruction to avoid prefetching redundant data during the prefetch operation.

12. In a data processing system, a method for prefetching blocks of data for loading into a cache in response to a parameter-selectable prefetch instruction, comprising:

determining if the parameter-selectable prefetch instruction has a first programmed condition that causes fetching of at least a portion of a prefetched block of data at least twice during prefetching of the block data; and executing the parameter-selectable prefetch instruction by generating cache line requests, in response to the parameter-selectable prefetch instruction, that are mutually exclusive in order to avoid fetching the at least a portion of the prefetched block of data at least twice.

13. The method of claim 12, wherein the step of executing comprises modifying the parameters of the parameter-selectable prefetch instruction to avoid prefetching the at least a portion of the prefetched block of data at least twice.

14. The method of claim 13, wherein the step of determining comprises comparing the parameters to predetermined parameter sets that are known to select redundant data.

15. The method of claim 14, wherein the step of modifying comprises substituting parameters corresponding to each of the predetermined parameter sets.

16. The method of claim 12, wherein the step of executing comprises preventing a request for a line in the cache if a previous request for the line in the cache by the parameter-selectable prefetch instruction was made.

17. The method of claim 12, wherein the step of executing comprises preventing a request for a line in the cache if an immediately preceding request was for the line in the cache.

18. The method of claim 12, wherein the parameters comprise a stride and the lines of the cache have a length, wherein the step of executing comprises:

modifying the parameters of the parameter-selectable prefetch instruction to avoid prefetching redundant data if the length exceeds the stride; and preventing a request for a line in the cache if a previous request for the line in the cache by the parameter-selectable prefetch instruction was made.

19. In a data processing system, a method for prefetching data for loading into a cache, which has a line length, in response to a parameter-selectable prefetch instruction, which has a stride parameter, comprising:

receiving the parameter-selectable prefetch instruction;

detecting if the line length exceeds the stride parameter of the received parameter-selectable prefetch instruction;

modifying the stride parameter to equal the line length if the line length exceeds the stride parameter of the received parameter-selectable prefetch instruction to form a modified parameter-selectable prefetch instruction; and executing the modified parameter-selectable prefetch instruction.

20. The method of claim 19, wherein:

the parameter-selectable prefetch instruction further has a number-of-blocks parameter; and the step of modifying further comprises modifying the number-of-blocks parameter if the line length exceeds the stride parameter of the received parameter-selectable prefetch instruction.

21. The method of claim 20, further comprising:

preventing a request for a line in the cache if a previous request for the line in the cache by the parameter-selectable prefetch instruction was made.

* * * * *